US012277617B2

(12) United States Patent
Kaneria et al.

(10) Patent No.: US 12,277,617 B2
(45) Date of Patent: Apr. 15, 2025

(54) METHODS AND SYSTEMS FOR VERIFYING AN INDIVIDUAL'S IDENTITY

(71) Applicant: Evernorth Strategic Development, Inc., St. Louis, MO (US)

(72) Inventors: Ankur Kaneria, Cedar Park, TX (US); Timothy B. Clise, Howell, MI (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 41 days.

(21) Appl. No.: 17/670,616

(22) Filed: Feb. 14, 2022

(65) Prior Publication Data

US 2023/0260069 A1 Aug. 17, 2023

(51) Int. Cl.
*G06Q 10/10* (2023.01)
*G06Q 10/06* (2023.01)
*G06Q 40/08* (2012.01)
*G06Q 50/26* (2012.01)

(52) U.S. Cl.
CPC .................................. *G06Q 50/265* (2013.01)

(58) Field of Classification Search
CPC .................................................... G06Q 50/265
USPC .................................................. 705/1.1, 325
See application file for complete search history.

(56) References Cited

U.S. PATENT DOCUMENTS

| | | | | |
|---|---|---|---|---|
| 8,032,927 | B2 | 10/2011 | Ross | |
| 8,856,954 | B1 * | 10/2014 | Hathaway | G06F 21/31 726/28 |
| 8,955,058 | B2 | 2/2015 | Castro | |
| 9,021,553 | B1 * | 4/2015 | Corn | G06F 21/31 726/2 |
| 9,195,822 | B2 | 11/2015 | Carlson | |
| 9,298,900 | B2 * | 3/2016 | Davis | G06F 21/316 |
| 9,497,178 | B2 | 11/2016 | Chow | |
| 9,516,008 | B2 | 12/2016 | Chow | |
| 9,674,177 | B1 * | 6/2017 | Nyström | H04L 63/083 |
| 9,684,782 | B2 | 6/2017 | Yang | |
| 10,013,972 | B2 | 7/2018 | Gross | |
| 10,108,794 | B2 * | 10/2018 | Bouse | H04L 63/102 |
| 10,121,015 | B2 | 11/2018 | Lemmey | |
| 10,255,419 | B1 * | 4/2019 | Kragh | G06F 21/32 |
| 10,521,572 | B2 | 12/2019 | Nygate | |

(Continued)

FOREIGN PATENT DOCUMENTS

EP 3762881 A1 1/2021

*Primary Examiner* — Jonathan P Ouellette
(74) *Attorney, Agent, or Firm* — Miller Johnson

(57) ABSTRACT

Methods and systems for analyzing data and electronic identity security are described. In one embodiment, an electronic identity security method comprises a processor receiving a request for identity verification from a device, accessing data associated with the individual seeking identity verification stored in a storage device, inferring derived facts about the individual by determining associations between known facts stored in the storage device using an intelligence algorithm or data mining operation, generating at least one identity verification question based on the known facts or the derived facts, evaluating at least one received answer to the at least one identity verification question to determine whether the individual answered the at least one identity verification question correctly, and verifying the individual's identity based on at least one received answer to the at least one identity verification question.

21 Claims, 7 Drawing Sheets

(56) References Cited

U.S. PATENT DOCUMENTS

| | | | | |
|---|---|---|---|---|
| 10,621,880 | B2 | 4/2020 | Boguraev | |
| 10,678,894 | B2 * | 6/2020 | Yin | H04L 63/08 |
| 10,891,360 | B2 * | 1/2021 | Nygate | G06N 5/04 |
| 11,030,287 | B2 * | 6/2021 | Obaidi | G06N 20/00 |
| 11,055,390 | B1 * | 7/2021 | Kragh | H04W 12/08 |
| 11,157,601 | B2 | 10/2021 | Miu | |
| 11,329,998 | B1 * | 5/2022 | Shahidzadeh | H04L 63/14 |
| 11,418,500 | B2 * | 8/2022 | Volcoff | G06F 21/316 |
| 11,769,577 | B1 * | 9/2023 | Dods | G16H 20/10<br>705/50 |
| 2006/0036540 | A1 | 2/2006 | Lawrence | |
| 2012/0123959 | A1 | 5/2012 | Davis | |
| 2013/0191898 | A1 * | 7/2013 | Kraft | G06F 21/31<br>726/6 |
| 2014/0137219 | A1 * | 5/2014 | Castro | H04L 67/02<br>726/6 |
| 2014/0279533 | A1 | 9/2014 | Hamilton | |
| 2015/0150104 | A1 * | 5/2015 | Melzer | G06N 20/00<br>726/7 |
| 2016/0371695 | A1 | 12/2016 | McElroy | |
| 2017/0289168 | A1 * | 10/2017 | Bar | H04L 63/1408 |
| 2018/0052981 | A1 * | 2/2018 | Nygate | G06N 20/00 |
| 2019/0095596 | A1 * | 3/2019 | Manganelli | G06F 21/32 |
| 2020/0082272 | A1 * | 3/2020 | Gu | G06N 3/045 |
| 2020/0252395 | A1 | 8/2020 | Mercier | |
| 2020/0356653 | A1 * | 11/2020 | Cho | G06N 3/084 |
| 2020/0366671 | A1 * | 11/2020 | Larson | G06F 9/451 |
| 2022/0391905 | A1 * | 12/2022 | Edwards | G06Q 20/40 |
| 2023/0030389 | A1 * | 2/2023 | Chaudhary | H04L 63/104 |
| 2023/0037692 | A1 * | 2/2023 | Edwards | G06Q 20/388 |

* cited by examiner

METHODS AND SYSTEMS FOR VERIFYING AN INDIVIDUAL'S IDENTITY

FIELD

The present disclosure relates generally to the technical field of electronic identity verification. In a specific example, the present disclosure may relate to identifying a beneficiary of a prescription drug benefit plan.

BACKGROUND

Conventional methods for verifying an individual's identity typically involve an identification card or other medium having the individual's name and/or photograph printed thereon. For example, to prove identity, the individual typically presents a government-issued identification card. However, in some situations, an individual does not possess a conventional identification card, which may prevent the patient or member from receiving access to an asset, which may impact the individual's quality of life.

DETAILED DESCRIPTION

Figure 1:
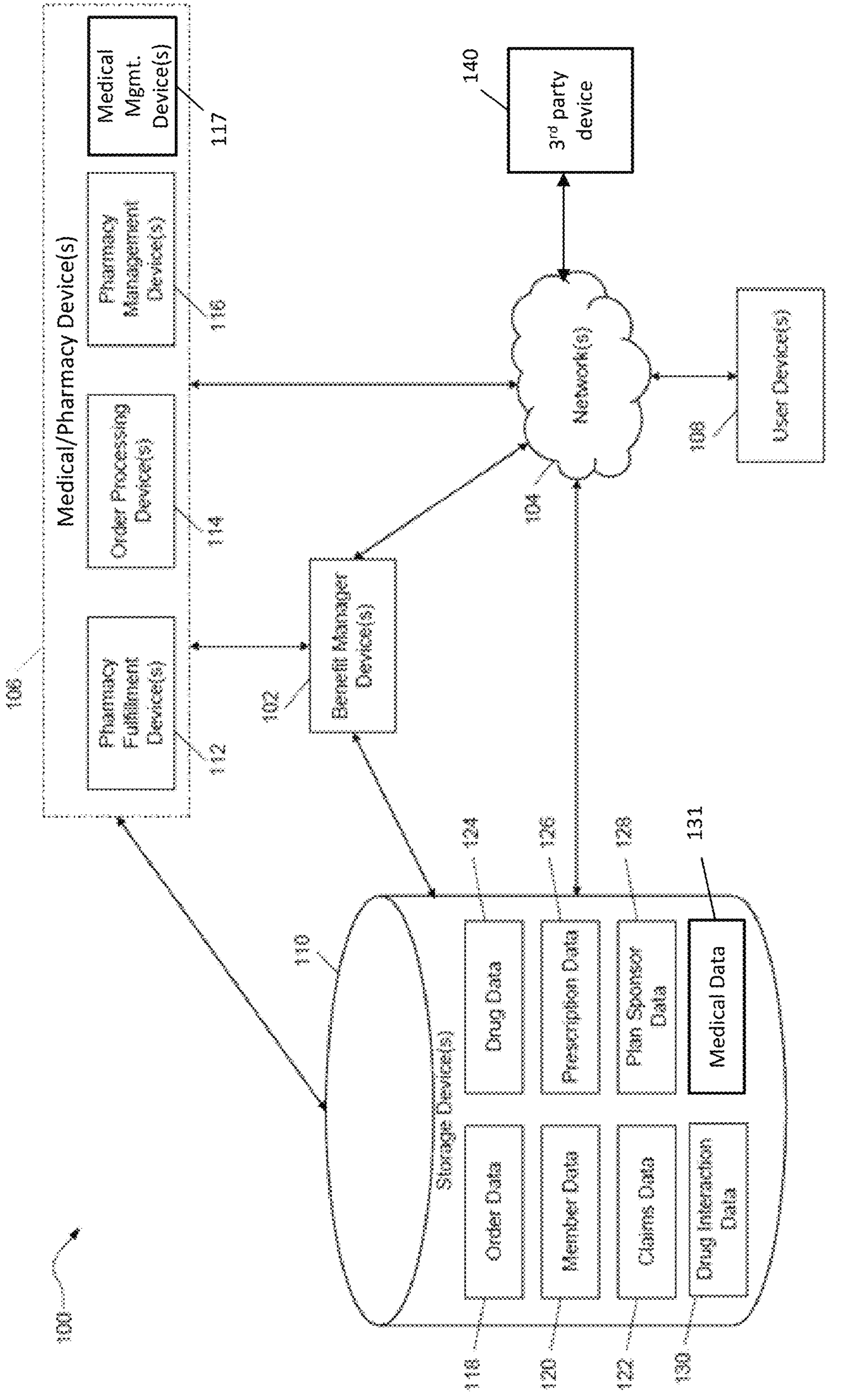
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a medical/pharmacy device 106 in communication with each other directly and/or over a network 104. The system 100 may also include a storage device 110.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long-term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device 108, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The user device 108 may be a stand-alone device, or may be a multi-use device. Examples of the user device 108 include a set-top box (STB), a receiver card, a mobile telephone, a personal digital assistant (PDA), a display device, a portable gaming unit, and a computing system; however, other devices may also be used. For example, the user device 108 may include a mobile electronic device, such an IPHONE or IPAD device by Apple, Inc., mobile electronic devices powered by ANDROID by Google, Inc., and a BLACKBERRY device by Research In Motion Limited. The user device 108 also include other computing devices, such as desktop computing devices, notebook computing devices, netbook computing devices, gaming devices, and the like. Other types of electronic devices may also be used. Additionally or alternatively, the user device 108 can execute an application that may use a cellular phone function of the user device 108. The application may include instructions that when executed on the user device 108, in the benefit manager device 102, or medical/pharmacy device 106, cause a machine to change its state or perform tasks within the machine and with other machines. Such devices become dedicated devices for executing the processes as described herein.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in the storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The medical/pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription, or the medical/pharmacy device 106 may be associated with a medical provider, such as doctor's office, hospital, medical facility, emergency care facility, dental office, orthodontist, ophthalmologist, or any other medical provider. The pharmacy or medical provider may use the medical/pharmacy device 106 to submit the claim to the benefit manager device 106 for adjudication.

Additionally, in some implementations, the medical/pharmacy device 106 may enable information exchange between the pharmacy or medical provider and the benefit manager device 106. For example, this may allow the sharing of member information such as drug history that may allow the pharmacy to better service a member (for example, by providing more informed therapy consultation and drug interaction information). Alternatively, a medical provider may submit a claim to determine a co-pay upon arrival of a patient for an appointment and provide medical chart data submitting medical data about the patient after the visit (e.g. a diagnosis). In some implementations, the benefit manager device 102 may track prescription drug fulfillment and/or other information for users that are not members, or have not identified themselves as members, at the time (or in conjunction with the time) in which they seek to have a prescription filled at a pharmacy.

The medical/pharmacy device 106 may include a pharmacy fulfillment device 112, an order processing device 114, a pharmacy management device 116, and a medical management device 117 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The medical management device 117 may independently communicate with the benefit manager device 102 to submit medical claims for adjudication. In some embodiments, the medical management device and submit medical claims data of claims adjudicated by a medical insurance company, a dental insurance company, a vision insurance company, or the like. In some embodiments the pharmacy/medical device 106 may only include the medical management device 117 and omit the pharmacy fulfillment device 112, an order processing device 114, a pharmacy management device 116. The benefit manager device 102 can store medical claims data in the storage device 110.

The storage device 110 may include: non-transitory storage (for example, memory, hard disk, CD-ROM, etc.) in communication with the benefit manager device 102 and/or the medical/pharmacy device 106 directly and/or over the network 104. The non-transitory storage may store order data 118, member data 120, claims data 122, drug data 124, prescription data 126, plan sponsor data 128, drug interaction data 130, and/or medical data 131. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, member demographics information, known allergies of each member, each member's primary doctors and caregivers, a respective list of doctors seen by each patient over a time period (and each doctor's office location/address), member surgeries and hospitalizations, a member's family health history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc. In addition, the member data 112 can include or reference prescription numbers associated with the member. Such member data 112 may be protected data that cannot be accessed by third parties. Without such access, the member data 112 may not be pooled with third party data for analysis, thus restricting the pool of data and the accuracy of the analysis. Member data 120 can further include relationships with other members, such as children, spouses, siblings, parents, or any family relationship known because a policy-holding member has a family policy that covers other family members.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. As a result, the claims data 122 can include a medication history for each member. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122. Alternatively, medical claims data can be stored as medical data 131, separate from the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), typical dosing instructions, etc. The drug data 124 may include information associated with a single medication or multiple medications. However, dosing instructions may come from the claims data 122 if the doctor prescribed dosing instructions different from the typical dosing instructions.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

Furthermore, the drug interaction data 130 can include all known interactions between various prescription drugs. The known interactions can be negative, positive, or benign. Further still, the drug interaction data 130 can include known interactions between each prescription drug and over-the-counter drugs, known interactions between each prescription drug and vitamins or medical herbs (e.g. St. John's Wort), or known interactions between each prescription drug and commonly used substances, such as alcohol.

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

The benefit manager device 102 can further communicate with a third-party device 140 over the network 104. The third-party device 140 can be any computer system that seeks to identify an individual. In some embodiments, the third-party device can be associated with a financial institution, a government entity, a doctor's office, another user device (like the user device 108), or any other third party that seeks to verify an individual's identity. Additionally, the benefit manager device 102 can receive identity verification requests from the medical/pharmacy device 106.

Figure 2:
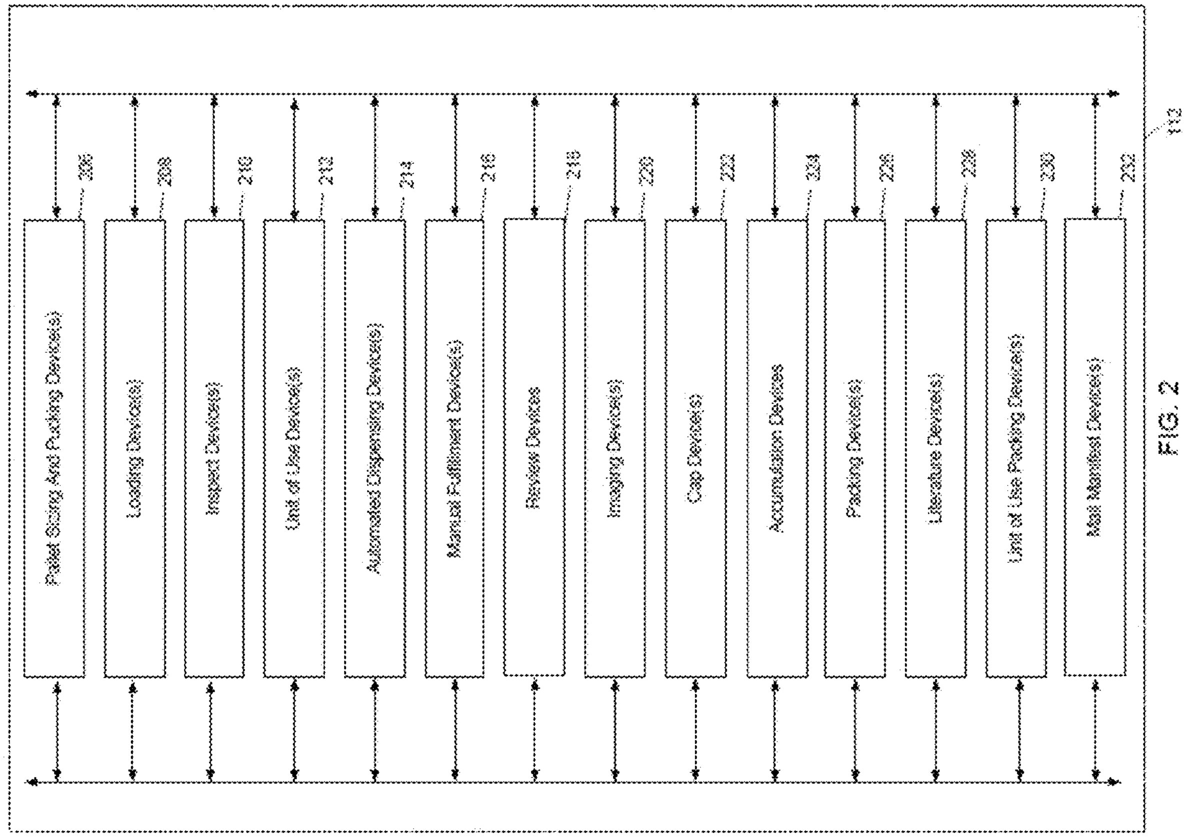
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device (s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

The operation of the devices in FIG. 2 may be dependent on the pooling of data from different database sources (e.g., different insurance companies) for analysis. However, such data may not be pooled due to technical regulations, legal regulations or for other reasons. In an example embodiment, the tool or engine for analyzing the data can be shared. The tool can analyze the data and provide an indication of whether each member record or an individual member record in the respective database in the pool of databases is flagged as in the covered group.

Figure 3:
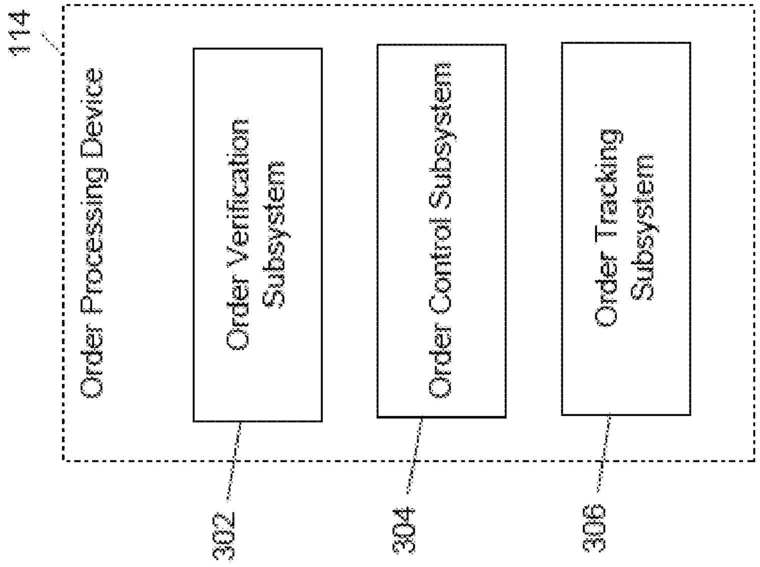
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem

306 may store data locally (for example, in a memory) or as a portion of the order data 118 stored in the storage device 110.

Example methods and systems for verifying an individual's identity are described. In the following description, for purposes of explanation, numerous specific details are set forth in order to provide a thorough understanding of example embodiments. It will be evident, however, to one of ordinary skill in the art that embodiments of the present disclosure may be practiced without these specific details.

Identifying individuals when dispensing a prescription drug typically occurs in one of two ways. For example, in a in-person setting, a pharmacist will ask to see an identification card or other medium (e.g., passport, driver's license, photo ID, insurance card, pharmacy benefit program card, etc.) before fulfilling a prescription and determine whether the person photographed or named in the identification card or medium is the same person presenting the identification card or medium. In a virtual setting, a computer typically verifies an individual's identity by verifying that a unique username and password was correctly entered into a form on a secure website.

In some situations, the individual will not possess an identification card or identifying credentials. For example, in a natural disaster situation, a mobile pharmacy may serve people impacted by the natural disaster, but the people impacted by the natural disaster may have had their identification cards destroyed by the natural disaster (e.g., by fire). Alternatively, a person may have forgot online user credentials. Nevertheless, people desire and sometimes need prescription medication to live a comfortable life.

Even in situations that rely on conventional methods, identification information can be forged or altered. Also, usernames and passwords have security limitations. Thus, there is an ongoing need for better verifications of an individual's identity. This is particularly true in the field of prescription medication where prescription medications can be abused and should only be dispensed to individuals having a proper prescription from a doctor.

Figure 4:
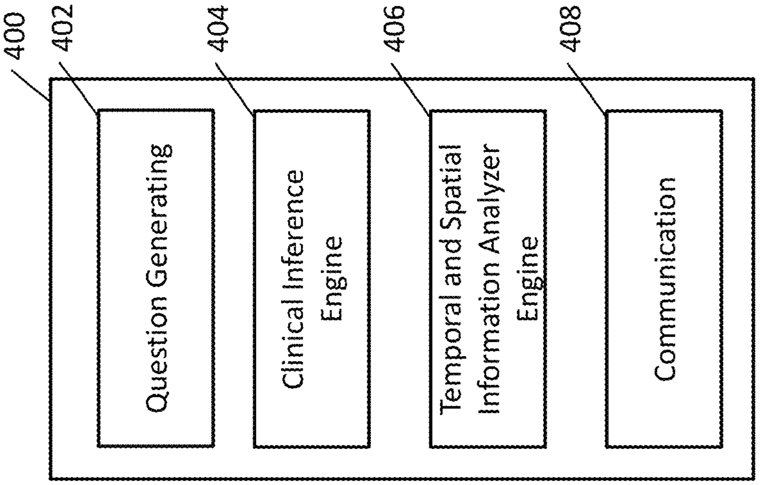
FIG. 4 is a block diagram of an example system architecture of an identity verification system for identifying an individual according to an example embodiment.

FIG. 4 illustrates an identity verification system 400, according to an example embodiment. The identity verification system 400 may be deployed in the system 100 or may otherwise be used. In some embodiments, the identity verification system 400 is a subsystem or module of the benefit manager device 102 in FIG. 1.

The identity verification system 400 may include a question generating subsystem 402. In some embodiments, the question generating subsystem 402 may review data stored in the storage device 110. As explained above, the storage device 100 can store various medical data about an individual, such as a member of the prescription drug benefit plan or an insured member having an insurance policy. The storage device 110 can store claims data 122, member data 120, and medical data 131, and the claims data 122, the member data 120, and medical data 131 can include information about an individual, such as all medications taken by the individual, known allergies of the individual, all medical claims 131 made by the individual, all hospitalizations by the individual, all surgeries performed on the individual, a list of doctors seen by the individual, office location and address for each doctor in the list of doctors seen by the individual, pharmacy location and address for each pharmacy used by the individual to fill a prescription, dental and optical information about an individual (whether the patient wears glasses, whether the patient has any crowns or fillings), dates when various procedures were performed or prescriptions first prescribed, the individual's demographics, the individual's name, birthdate, and gender, the individual's medical or seasonal allergies, whether the individual sees a psychiatrist, and many other medical data about the individual. The storage device 110 may also include non-medical information, such as travel information, but for the purposes herein, the exemplary embodiments will focus on medical data about an individual. The question generating subsystem 402 can receive the claims data 122, the member data 120, the medical data 131 (and other data if necessary) from the storage device 110, the question generating subsystem 402 can analyze the claims data 122, the member data 120, and the medical data 131 from the storage device 110, and the question generating subsystem 402 can generate identity verification questions using the claims data 122, the member data 120, and the medical data 131 from the storage device 110.

In some embodiments, the question generating subsystem 402 can generate questions prior to receiving an identity verification request from the third-party device 140, the user device 108, or the medical/pharmacy device 106. The question generating subsystem 402 can receive and analyze data for each individual having data stored in the storage device 110 and generate questions based on the analyzed data. In an alternative embodiment, the question generating subsystem 402 can generate questions in response to receiving an identity verification request from the third-party device 140, the user device 108, or the medical/pharmacy device 106.

Generally, the question generating subsystem 402 is tasked with generating questions asking for 1$^{st}$ degree intelligence data, also called "known facts" (1$^{st}$ degree intelligence). For example, the question generating subsystem 402 can analyze the data stored in the storage device 110, determine that the individual had a double bypass surgery at Northwestern Memorial Hospital in Chicago, and generate the question, "Where did you have you double bypass surgery?" or ""What surgery did you have at Northwestern Memorial Hospital in Chicago?". A user of a computer terminal (e.g., the third-party device 140, the user device 108, or the medical/pharmacy device 106) could enter an answer at the computer terminal, via typing the answer into a keyboard, speaking an input into a microphone, or any other method, and the question generating subsystem 402 can receive the answer and determine whether the correct answer was received. If the input is an audio input, the question generating subsystem 402 can include speech-to-text technology to interpret the audio input. In some embodiments, the question generating subsystem 402 can determine whether an answer was fully correct (e.g., if it received the string "Northwestern Memorial Hospital") or if the answer was partially correct (e.g., if it received the string "Northwestern"). A partially correct answer may generate less confidence when generating a confidence score (described below). In some embodiments, answers can be entered as a text string into a form or an audio response. In another embodiment, answers can be provided as a multiple-choice selection (e.g., radio button selection).

The question generating subsystem 402 can generate numerous other questions based on numerous other medical, health, and fitness data stored in the storage device 110. For example only, the question generating subsystem 402 can generate the following questions:

Which one of the below clinics did you receive the COVID-19 vaccine?

Which one of below locations did you visit for your last flu shot?

Where do you normally fill your prescriptions?

What kind of surgery did you have recently?

Who is your primary care provider?

Where do you go to get your eyes checked?

What allergies do you have?

Who is your dentist?

Which medications are you taking from the below list?

In this way, the question generating subsystem 402 can generate basic questions using known facts about an individual and evaluate whether the identity verification system 400 received a fully or partially correct answer. After receiving the answer, the question generating subsystem 402 can report whether the answer received was fully correct, partially correct, or incorrect. A partially correct answer may generate less confidence when generating a confidence score (described below).

The identity verification system 400 can further include a clinical inference engine 404. The clinical inference engine 404 can include an artificial intelligence algorithm or machine learning algorithm that can derive or infer information from the known facts stored in the storage device 110. The derived information may be considered "derived facts" (e.g., a type of $2^{nd}$ degree intelligence). The clinical inference engine 404 can further include a data mining feature to analyze large amounts of medical data, and the artificial intelligence engine can generate inferences or conclusions not clearly stored as known facts in the storage device 110. The clinical inference engine 404 can analyze multiple known facts stored as data in the storage device 110 and infer conclusions based on multiple known facts stored as data in the storage device 110. The clinical inference engine 404 can use a neural network or other machine learning or data mining process to find connections and inference about the known facts to determine the derived facts. For example, the clinical inference engine 404 can find that an individual has seen a chiropractor and that the individual was prescribed a pain medication, and the clinical inference engine 404 can infer that the individual suffers from back pain. In response to inferring this situation, the clinical inference engine 404 can generate the question "do you suffer from back pain?" or "which body part causes you pain?". The clinical inference engine 404 may also determine a patient's age before asking the back-pain question because numerous older patients may have back pain, whereas it might be relatively unusual for a younger patient to experience back pain. As such, the clinical inference engine 404 may consider this back pain question $1^{st}$ degree intelligence for an older patient and $2^{nd}$ degree intelligence for a younger patient.

As another example, the clinical inference engine 404 can find that an individual saw a doctor specializing in orthopedic shoulder surgeries and that the claims data 122 indicates a shoulder injury and a medical claim for a sling, and the clinical inference engine 404 can infer that the individual will be undergoing shoulder surgery soon even though no claims data for a shoulder surgery yet exists in the storage device 110. In response to inferring this situation, the clinical inference engine 404 can generate the question "are you going to have shoulder surgery in the near future?" or "which body part will be operated on in the near future?".

As yet another example, an individual may have visited an orthodontist for a consultation. The clinical inference engine 404 can infer that the individual is likely to get braces as a result of that consultation, or the clinical inference engine 404 may know for certain by reviewing the medical data 131 that the individual is set to receive braces. The clinical inference engine 404 can then generate the question "when are you scheduled to get braces?" Additionally, the clinical inference engine 404 may understand that most of the orthodontist's patients are referrals from a certain dentist. Thus, the clinical inference engine 404 may ask the question "which doctor referred you to Dr. [Orthodontist] for realigning your teeth?".

As yet another example still, the clinical inference engine 404 may analyze a provider's scheduling history. For example, the clinical inference engine 404 can analyze the orthodontist's scheduling history to learn that most or all of the patients who seek a consultation receive an appointment in a month or less. If the clinical inference engine 404 determines that the patient sought a consultation on April 1, the clinical inference engine 404 can be reasonably certain that the patient will receive an appointment in the month of April. Thus, the clinical inference engine 404 can ask the question "when is your orthodontist appointment scheduled?", and any answer in April may be an acceptable answer.

Moreover, the clinical inference engine 404 can predict how soon a patient will receive a follow-up appointment based on test data in the medical data 131 or scheduling history of the provider. For example, a cardiologist may perform a CT angiography (CTA) to determine whether an individual has a blood clot and the location of any blood clot. The clinical inference engine 404 can use artificial intelligence to analyze the test data resulting from the CTA to determine whether a patient will have an immediate follow-up appointment or a slower follow-up appointment. The location of the blockage can indicate whether the next appointment will be the immediate follow-up appointment or the slower follow-up appointment (e.g. close to the heart requires an immediate follow-up or a quick trip to the hospital). As a result, the clinical inference engine 404 can ask how soon the doctor recommended a follow-up appointment. As such, the clinical inference engine 404 can derive the derived facts about the patient and about the provider. The turn-around time for a follow-up appointment may also depend on whether the provider has certain facilities, such as an on-site surgical center.

Like the question generating subsystem 402, a user of the computer terminal (e.g., the third-party device 140, the user device 108, or the medical/pharmacy device 106) can enter an answer at the computer terminal, and the clinical inference engine 404 can receive the answer and determine whether the correct answer was received. In some embodiments, the clinical inference engine 404 can determine whether an answer was fully correct, partially correct, or incorrect. A partially correct answer may generate less confidence when generating a confidence score (described below).

The derived facts inferred by the clinical inference engine 404 can be called $2^{nd}$ degree intelligence because the answers to the questions generated by the clinical inference engine 404 cannot be easily determined by simply referencing data stored in the storage device 110. As such, the questions posed by the clinical inference engine 404 will be more personal and private than the $1^{st}$ degree intelligence. As such, answering at least one $2^{nd}$ degree intelligence question may be necessary to receive sensitive information, controlled prescription drugs information, and the like. In addition, correctly answering a $2^{nd}$ degree intelligence question may provide higher confidence in verifying the identity of the individual seeking to be identified.

The clinical inference engine 404 can generate numerous other questions based on numerous other relationships between medical data stored in the storage device 110. These questions can be derived from actual data, e.g., prescription data or health data. For example only, the clinical inference engine 404 can generate the following questions:

Did you get treatment for anxiety/depression?

Did you suffer a hamstring injury requiring rehab treatment?

Are you suffering with insomnia?

In this way, the clinical inference engine 404 can generate $2^{nd}$ degree intelligence questions using derived conclusions about an individual and evaluate whether the identity verification system 400 received a fully or partially correct answer. The clinical inference engine 404 can report whether the answer received was fully correct, partially correct, or incorrect. In some embodiments, answers can be entered as a text string into a form. In another embodiment, answers can be provided as a multiple-choice selection.

The identity verification system 400 can further include a temporal and spatial information analyzer engine 406. The temporal and spatial information analyzer engine 406 can also include artificial intelligence or machine learning that can derive information from the medical data stored in the storage device 110. The temporal and spatial information analyzer engine 406 can further include a data mining feature to analyze large amounts of medical data, and the temporal and spatial information analyzer engine 406 can generate inferences or conclusions not clearly stored as data in the storage device 110. The temporal and spatial information analyzer engine 406 can analyze multiple known facts stored as data in the storage device 110 and infer conclusions based on multiple known facts stored as data in the storage device 110 and based on other information such as geographical data, familial relationships, or time-based factors. For example, the temporal and spatial information analyzer engine 406 can find that an individual has a daughter, and that the individual's daughter was born in Bronson Hospital in Kalamazoo, Michigan. In response to understanding this situation, the temporal and spatial information analyzer engine 406 can generate the question "Name the hospital where your daughter was born?". In another more complicated example, the temporal and spatial information analyzer engine 406 can find that the individual lives in Ann Arbor, Michigan but the individual's daughter was born in Bronson Hospital in Kalamazoo, Michigan. In response to understanding that the individual's daughter was born in a different city than where the individual currently resides, the temporal and spatial information analyzer engine 406 can generate the question "Name the out-of-town hospital where your daughter was born?". This out-of-town question would be more difficult for a defrauder to guess because a defrauder may know where the individual currently lives, and if the daughter was born in the city where the individual lives, then the defrauder could easily guess the answer, especially if the city where the individual lives only has one hospital. Of course, if the individual does not have any children, then the temporal and spatial information analyzer engine 406 may not generate any questions about children but instead may generate questions about a spouse, parent or sibling. Alternatively, the temporal and spatial information analyzer engine 406 may generate questions about children that do not exist to confuse and deter a potential defrauder.

As another example, the temporal and spatial information analyzer engine 406 can find that the individual has hay fever allergies in the spring because a prescription allergy drug is prescribed only in the spring. In response to understanding this situation, the temporal and spatial information analyzer engine 406 can generate the question "what type of allergies do you suffer from in the spring?". In some embodiments, the temporal and spatial information analyzer engine 406 can pose allergy questions only during the timeframe when the individual has seasonal allergies (e.g., March-May) because the question may confuse the individual when it is not allergy season.

Like the question generating subsystem 402, a user of the computer terminal (e.g., the third-party device 140, the user device 108, or the medical/pharmacy device 106) can enter an answer at the computer terminal, and the temporal and spatial information analyzer engine 406 can receive the answer and determine whether the correct answer was received. In some embodiments, the temporal and spatial information analyzer engine 406 can determine whether an answer was fully correct, partially correct, or incorrect. A partially correct answer may generate less confidence when generating a confidence score (described below).

The derived facts inferred by the temporal and spatial information analyzer engine 406 can be called $3^{rd}$ degree intelligence because the answers to the questions generated by the temporal and spatial information analyzer engine 406 are highly personal and would be difficult for a bad actor to ascertain. As such, the questions posed by the temporal and spatial information analyzer engine 406 will be more personal and private than the $1^{st}$ degree intelligence and/or $2^{nd}$ degree intelligence. As such, answering at least one $3^{rd}$ degree intelligence question may be necessary to receive extremely sensitive information, highly controlled prescription drugs (narcotics, opioids, etc.), and the like. In addition, correctly answering a $3^{rd}$ degree intelligence question may provide the highest confidence that the individual seeking to be identified is indeed the correct person.

The temporal and spatial information analyzer engine 406 can generate numerous other questions based on numerous other medical data stored in the storage device 110. For example only, the clinical inference engine 404 can generate the following questions:

Does your wife take any prescription medications in the spring?

How do you get to your doctor's office from your house?

Has your son ever undergone surgery?

Where were you travelling when you got the flu?

What road do you use to get to your dentist's office?

In this way, the temporal and spatial information analyzer engine 406 can generate $3^{rd}$ degree intelligence questions using derived facts about an individual and evaluate whether the identity verification system 400 received a fully or partially correct answer. The temporal and spatial information analyzer engine 406 can report whether the answer received was fully correct, partially correct, or incorrect. In some embodiments, answers can be entered as a text string into a form. In another embodiment, answers can be provided as a multiple-choice selection.

In some embodiments, any of the question generating subsystem 402, the clinical inference engine 404, or the temporal and spatial information analyzer engine 406 can generate questions that do not apply to the individual in an effort to detect and deter bad actors. For example, the question generating subsystem 402 can generate the question "which body part did you have surgery on in 2021", and the correct answer can be "nothing" because the individual did not undergo surgery in 2021.

Additionally, for heightened security, any of the question generating subsystem 402, the clinical inference engine 404, or the temporal and spatial information analyzer engine 406 can generate questions about another individual having the same name as the individual to weed out would-be defrauders. For example, numerous individuals having data in the storage 110 may have the name John Smith. Knowing this fact, any of the question generating subsystem 402, the clinical inference engine 404, or the temporal and spatial information analyzer engine 406 can generate questions that apply to a different John Smith other than the John Smith seeking identity verification. For example, consider the situation where two individuals having the name John Smith have data stored in the storage 110, the first John Smith has a birthday in April, and the second John Smith has a birthday in June. In this example, the first John Smith having a birthday in April had knee surgery in 2021, but the second John Smith did not have knee surgery in 2021. If a user attempts to verify the identity of the second John Smith, the question generating subsystem 402 may generate the "which body part did you have surgery on in 2021", and if the question generating subsystem 402 receives the answer "knee", the system can be confident that a defrauder is attempting to impersonate the first John Smith.

Additionally, any of the question generating subsystem 402, the clinical inference engine 404, or the temporal and spatial information analyzer engine 406 can determine whether a question is a bad question to ask for a particular situation. For example, if there is only one pharmacy where an individual lives, then asking a questions like "where do you fill your prescriptions" may be a bad question because the correct answer to this question would be very easy to guess using only a search engine. Also, if a significant number of doctors within a certain area have the same last name (e.g., "Patel"), then asking an individual for their doctor's name as a means of identity verification is also a bad question. As such, any of the question generating subsystem 402, the clinical inference engine 404, or the temporal and spatial information analyzer engine 406 can evaluate each question asked before asking it to determine if the question would be easy or probable for a defrauder to guess. In some embodiments, the identity verification system 400 can transmit the most unique question determined based on the medical data stored in the storage 110 about the individual.

In addition, the identity verification system 400 can further include a communications subsystem 408. The communication subsystem 408 can communicate with the third-party device 140, the user device 108, and the medical/pharmacy device 106 via the network 104. As such, the communication subsystem 408 can send questions generated by one of the question generating subsystem 402, the clinical inference engine 404, and the temporal and spatial information analyzer engine 406, and receive answers from the third-party device 140, the user device 108, and the medical/pharmacy device 106. In addition, the communication subsystem 408 can create a secure portal or channel for sending questions and receiving answers involving private medical information. The secure portal or channel can remain secure using a strong firewall between a third-party computer terminal and the identity verification system 400. In this way, the communication subsystem 408 can act as an enterprise authentication and authorization system so that private medical information can be used to verify an individual's identity without revealing the private medical information to a third party or violating HIPAA or any other privacy laws. The secure portal or channel can ensure that the questions and answers provided remain within the control of a single entity, such as the benefit manager device 102, which is already tasked with tracking, storing, and protecting private medical data about individuals.

Because the identity verification system 400 does not reveal any private medical data to any third party or third-party device, and identity verification using private medical data is evaluated entirely within the identity verification system 400, the identity verification system 400 can verify an individual's identity in any setting. For example, the identity verification system 400 can evaluate an individual's identity when an individual seeks to open a new line of credit, when an individual seeks to electronically sign a document, each time an individual fills or refills a prescription, each time an individual logs into a secure website, when an individual attempts to make a large purchase, when an individual applies for a job, when an individual applies for a government benefit, or any other situation requiring identity verification.

Additionally, the identity verification systems and methods herein can be integrated into a parcel delivery service to ensure that delivery arrives to the correct individual. In an automated delivery service (e.g., an unmanned aerial drone), the automated delivery vehicle can require identity verification using the medical challenge questions described herein before releasing a package for delivery.

The identity verification system 400 can tailor the questions based on the situation. For example, in highly secure situations (e.g., applying for a loan or filling an opioid prescription), a majority or all of the questions asked may be 3$^{rd}$ degree intelligence questions. In less critical situations (e.g., filling a birth control prescription, logging into a website), a majority or all of the questions asked may be 1$^{st}$ degree intelligence questions.

The communications subsystem 408 can further communicate with the question generating subsystem 402, the clinical inference engine 404, or the temporal and spatial information analyzer engine 406 to receive indicators whether the answers received were correct, incorrect, or partially correct. The communications subsystem 408 can generate a confidence score based on the indicators from the question generating subsystem 402, the clinical inference engine 404, and the temporal and spatial information analyzer engine 406. The communication subsystem 408 can further weigh the confidence scores from the question generating subsystem 402, the clinical inference engine 404, and the temporal and spatial information analyzer engine 406, such as by giving the least weight to correct answers to questions generated by the question generating subsystem 402 and the most weight to correct answers to questions generated by the temporal and spatial information analyzer engine 406. The communication subsystem 408 can further give weight based on whether the answer was correct or incorrect. Also, if the communication subsystem receives an indicator that an incorrect answer would have been correct for another individual having the same name, that incorrect answer can be highly weighted against identity verification. After receiving indicators that indicate whether an answer was correct or incorrect, the communication subsystem can determine whether to issue a token indicating that the individual's identity is verified.

The communications subsystem 408 can determine whether the confidence level exceeds a threshold. In some situations, the confidence level can exceed the threshold only when all questions asked were correctly or partially correctly. In some situations, receiving one or a few incorrect answers may be acceptable. In other words, the threshold can vary in value based on the level of access being requested. A highly controlled drug, such as an opioid, may require a very high confidence score (95% or higher), whereas a 1000 mg Ibuprofen prescription may require only a 51% or higher confidence score. In another embodiment, a very high confidence score (e.g., 80%) may be necessary to obtain a home equity loan, whereas a lower confidence score (e.g., 70%) may be necessary to make a stock trade on an electronic stock trading platform. The value of the confidence score can increase when the individual answers more 2$^{nd}$ and 3$^{rd}$ degree intelligence questions.

Once the communications subsystem 408 determines that the confidence score exceeds the threshold, the communications subsystem 408 can generate a token indicating that the identity verification system 400 successfully verified the individual's identity. The communications subsystem 408 can transmit the token to a mobile device of the individual seeking identity verification, and the individual can use the token to access a secure asset, such as a prescription drug, a line of credit, etc. The token can remain valid for a predetermined amount of time, and the predetermined amount of time can vary based on the security of the asset. For example, a highly controlled or sensitive asset (e.g., opioid prescription) may generate a single-use token, whereas another token may be valid for multiple days, weeks, months or transactions. The token can further include the confidence score, and the confidence score may indicate how long the token is valid or whether the token can be used for a subsequent transaction.

When a third-party requests identity verification from the identity verification system 400, the third-party may only see the token after redirecting a user to the identity verification system 400. In other words, a user may use a computer terminal to access a third-party asset located, for example, at the third-party's webpage. Upon attempting to access the asset, the third-party webpage may redirect the user to a secure website associated with the identity verification system 400 in order to obtain the token. Upon receiving the token, the user can provide the token to the third-party website and use the token to obtain access to the asset.

The token can be a unique number or identifier, which might also identify the asset to which the user seeks access. In some embodiments, the identity verification system 400 can reference or access the blockchain to ensure that the token is unique.

Figure 5:
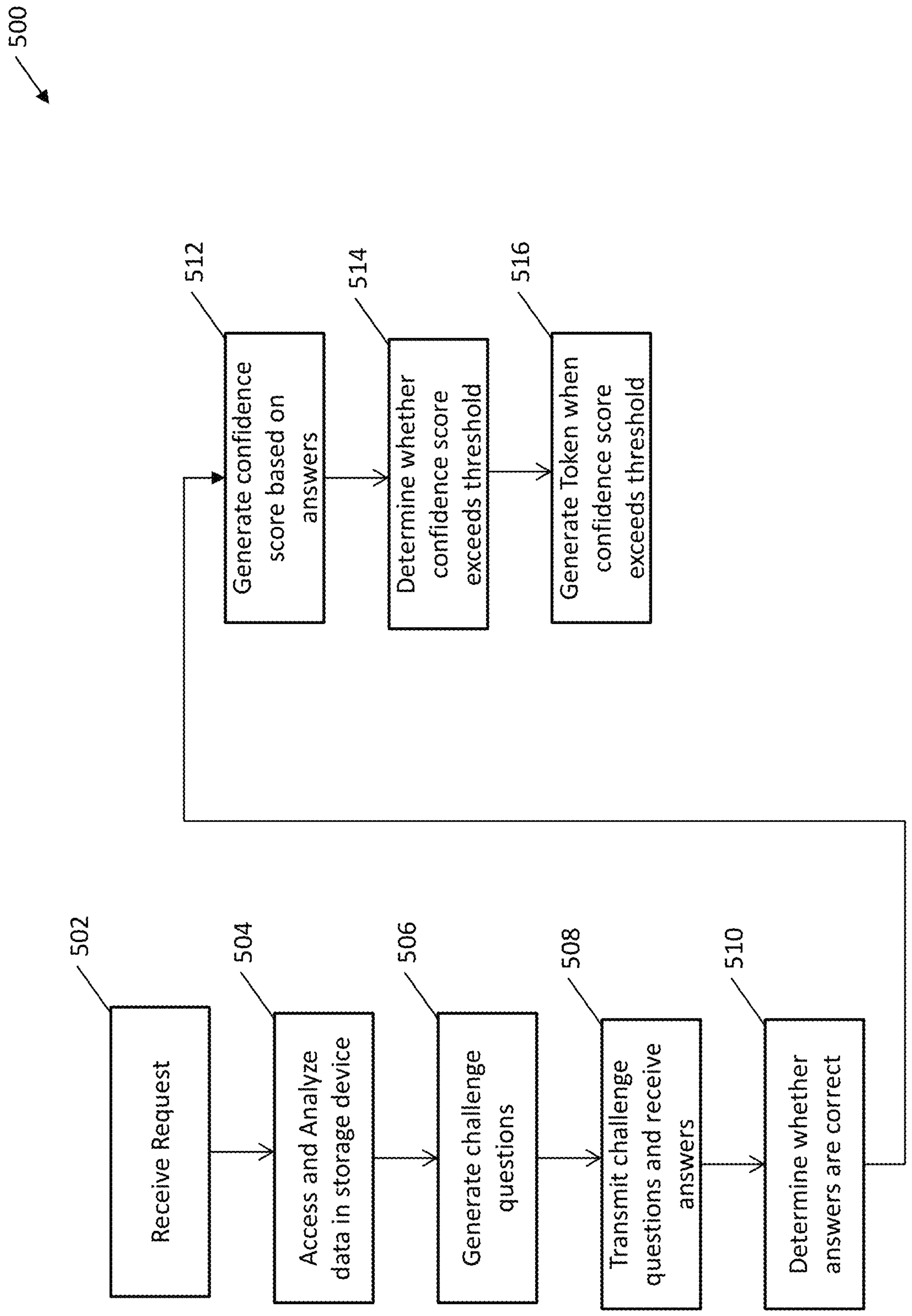
FIG. 5 is a block diagram of a flowchart illustrating an example sequence flow for identifying an individual, according to an example embodiment.

FIG. 5 illustrates a method 500 for verifying an individual's identity. The method 500 may be performed by the benefit manger device 102 executing the identity verification system 400, partially by the benefit manager device 102 and partially by the third-party device 140, or may be otherwise performed. For the sake of simplicity, the benefit manger device 102 will be described as performing the steps of the method 500, but the embodiments described herein are not so limited.

According to an exemplary embodiment, the benefit manger device 102 executing the identity verification system 400 can receive a request for identity verification in step 502. According to an exemplary embodiment, the benefit manger device 102 can also receive an individual's name and birthdate with the request for identity verification, but other identifiers are envisioned (e.g., username, email address, home address, etc.). Subsequently, the benefit manger device 102 accesses and analyzes data stored in a storage device 110 associated with the individual in step 504. In some embodiments, the data stored in a storage device 110 associated with the individual comprises medical data.

After analyzing the data, the benefit manager device 102 can generate challenge questions based on the data to use for verifying the individual's identity in step 506. Generating questions in step 506 can include inferring and deriving derived facts about the individual using the known facts from the data stored in the storage device 110. In this way, the derived facts may not be stored as known facts in the storage device 110. Inferring and deriving the derived facts can include an artificial intelligence algorithm or data mining algorithm analyzing the known facts and determining associations between the known facts.

In some embodiments, the benefit manager device 102 can determine or receive an indicator of the sensitivity, confidentiality, or level of regulation related to an asset sought by the individual. In some embodiments, the benefit manager device 102 can generate more questions for highly sensitive, confidential or highly regulated assets. Alternatively or additionally, the benefit manager device 102 can generate more or a majority 2$^{nd}$ and 3$^{rd}$ degree intelligence questions using derived facts for highly sensitive, confidential or highly regulated assets. That is, depending on the indicator, the benefit manager device 102 can generate more difficult or more private questions based on the data in the storage device 110.

In some embodiments, the benefit manager device 102 can evaluate the questions generated before transmitting them to the individual. Evaluating the questions can include determining whether the questions generated would be sufficiently easy to guess given geographical, time-based or other factors, which were explained above. In some embodiments, the benefit manager device 102 can generate questions that do not apply to the individual to further ensure that the individual's identity is verified.

Subsequently, the benefit manager device 102 can transmit the questions to the individual and receive answers to the questions in step 508, and the benefit manager device 102 can determine whether the answers were correct in step 510. In some embodiments, the benefit manager device 102 can consider whether the answers were fully correct or partially correct or incorrect.

Subsequently, the benefit manager device 102 can generate a confidence score, in step 512, based on the questions asked and the answers received. The benefit manager device 102 can weigh correct answers to 3$^{rd}$ degree intelligence questions more heavily than 2$^{nd}$ degree intelligence questions and weigh 2$^{nd}$ degree intelligence questions more heavily than 1$^{st}$ degree intelligence questions. Alternatively, the benefit manager device 102 can weigh all answers the same, but the benefit manager device 102 can generate more 2$^{nd}$ and 3$^{rd}$ degree intelligence questions for highly sensitive or confidential assets.

Subsequently, the benefit manager device 102 can compare the confidence score to a threshold to determine if the identity is verified in step 514. If the confidence score meets or exceeds the threshold, the benefit manager device 102 can verify the individual's identity. If the confidence score does not meet or exceed the threshold, the benefit manager device 102 does not generate the token. In some embodiments, the threshold can vary based on the sensitivity or confidentiality of the asset, or the threshold for identity verification can always remain the same. If the benefit manager device 102 verifies the individual's identity, the benefit manager device 102 can generate a token for use in accessing the asset in step 516.

Figure 6:
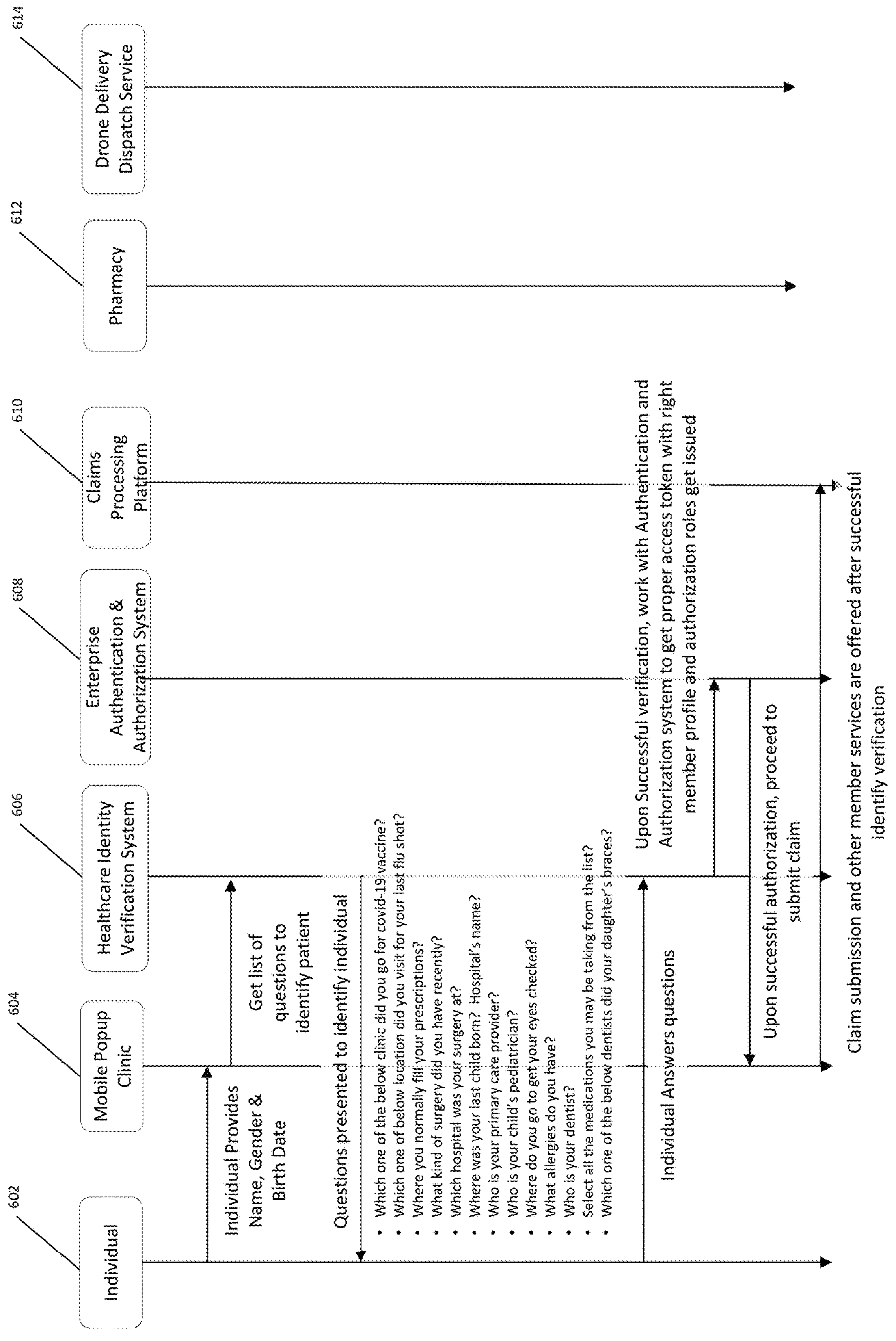
FIG. 6 is a flow diagram illustrating example interactions of various devices to identify an individual, according to an example embodiment.

FIG. 6 illustrates a method flow showing the interaction between various computer systems. As shown, an individual using an individual device 602 can transmit an identifier, such as a name, gender, and date of birth to a mobile pop-up clinic 604. The mobile pop-up clinic 604, using a frontend application, can request identity verification of the individual from an identity verification system 606. The identity verification system 606 can transmit generated questions to the individual device 602, and the individual can transmit answers to the identity verification system 606. The identity verification system 606 can work with an enterprise authentication and authorization system 608 to receive an access token when the identity verification system 606 verifies the individual's 602 identity. In the pharmaceutical embodiment described in FIG. 6, the enterprise authentication and authorization system 608 can transmit the token to the mobile pop-up clinic 604 so that the mobile pop-up clinic can submit a claim to the claims processing platform 610.

While the mobile pop-up clinic 604 is described an illustrated in FIG. 6 for exemplary purposes, other embodiments are envisioned, such as replacing the actions of the mobile pop-up clinic 604 with a pharmacy 612 or a drone delivery dispatch service 614. Either the pharmacy 612 or the drone delivery dispatch service 614 can implement the frontend application to communicate with the identity verification system 606.

Figure 7:
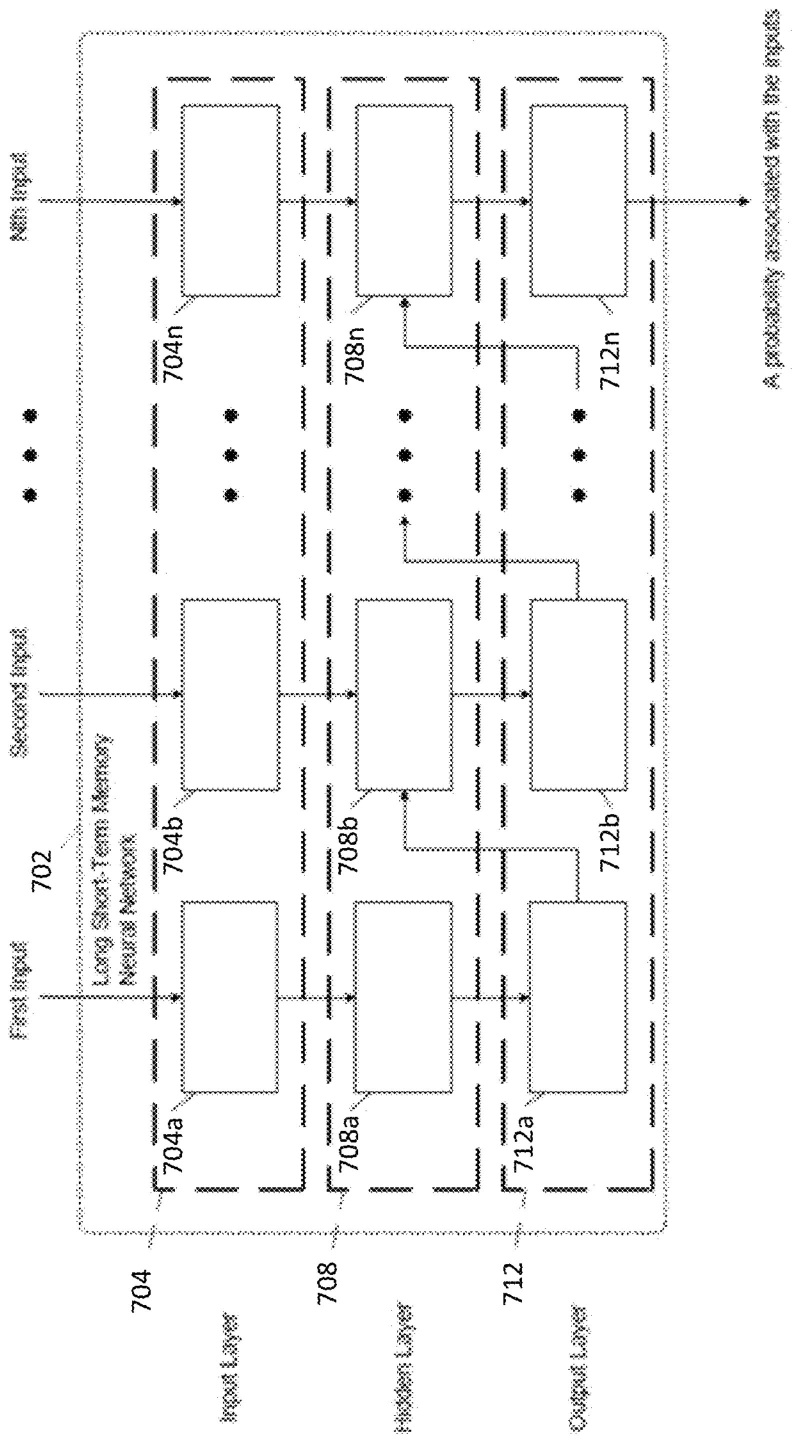
FIG. 7 is an example of an inference engine, according to an example embodiment.

FIG. 7 is a functional block diagram of an example neural network 702 that can be used for the inference engine or other functions (e.g., engines) as described herein. In an example, the neural network 702 can be a LSTM neural network. In an example, the neural network 702 can be a recurrent neural networks (RNN). The example neural network 702 may be used to implement the machine learning as described herein, and various implementations may use other types of machine learning networks. The neural network 7072 includes an input layer 704, a hidden layer 708, and an output layer 712. The input layer 704 includes inputs 704*a*, 704*b* . . . 704*n*. The hidden layer 708 includes neurons 708*a*, 708*b* . . . 708*n*. The output layer 712 includes outputs 712*a*, 712*b* . . . 712*n*.

Each neuron of the hidden layer 708 receives an input from the input layer 704 and outputs a value to the corresponding output in the output layer 712. For example, the neuron 708*a* receives an input from the input 704*a* and outputs a value to the output 712*a*. Each neuron, other than the neuron 708*a*, also receives an output of a previous neuron as an input. For example, the neuron 708*b* receives inputs from the input 704*b* and the output 712*a*. In this way the output of each neuron is fed forward to the next neuron in the hidden layer 708. The last output 712*n* in the output layer 712 outputs a probability associated with the inputs 704*a*-704*n*. Although the input layer 704, the hidden layer 708, and the output layer 712 are depicted as each including three elements, each layer may contain any number of elements.

In various implementations, each layer of the neural network 702 must include the same number of elements as each of the other layers of the neural network 702. For example, historical patient data may be processed to create the inputs 704*a*-704*n*. The output of the neural network 702 may represent a derived fact. More specifically, the inputs 704*a*-704*n* can include known facts stored in the storage device 110. The known facts can be provided to neurons 708*a*-708*n* for analysis and connections between the known facts. The neurons 708*a*-708*n*, upon finding connections provides the potential connections as outputs to the output layer 712, which determines a probability whether the potential connections are derived facts. For example, the neurons 708*a*-708*n* can receive two known facts about an individual—that the individual has a daughter, and the daughter fills a prescription at a first pharmacy. The neurons 708*a*-708*n* can determine that the prescriptions are typically filled at the first pharmacy by analyzing the number of refills made by the daughter at that prescription. The output layer 712 can confirm this derived fact and output that the daughter typically fills her prescriptions at the first pharmacy as a derived fact.

In some embodiments, a convolutional neural network may be implemented. Similar to neural networks, convolutional neural networks include an input layer, a hidden layer, and an output layer. However, in a convolutional neural network, the output layer includes one fewer output than the number of neurons in the hidden layer and each neuron is connected to each output. Additionally, each input in the input layer is connected to each neuron in the hidden layer. In other words, input 704*a* is connected to each of neurons 708*a*, 708*b* . . . 708*n*.

In various implementations, each input node in the input layer may be associated with a numerical value, which can be any real number. In each layer, each connection that departs from an input node has a weight associated with it, which can also be any real number. In the input layer, the number of neurons equals number of features (columns) in a dataset. The output layer may have multiple continuous outputs.

As mentioned above, the layers between the input and output layers are hidden layers. The number of hidden layers can be one or more (one hidden layer may be sufficient for many applications). A neural network with no hidden layers can represent linear separable functions or decisions. A neural network with one hidden layer can perform continuous mapping from one finite space to another. A neural network with two hidden layers can approximate any smooth mapping to any accuracy.

In view of the foregoing, an individual's identity can be confirmed using highly personal, highly secure, and highly private information. The information generated about an individual, particularly the information requested by $2^{nd}$ and $3^{rd}$ level Intelligence questions, refers to derived information about an individual, which is information that would be particularly difficult for a hacker or other nefarious actor to learn or easily glean from a user. In particular, the information requested by such $2^{nd}$ and $3^{rd}$ level Intelligence questions will not simply exist as data that could be exposed by a data breach. Moreover, by asking $2^{nd}$ and $3^{rd}$ level Intelligence questions, the identity verification process is highly secure and highly likely to verify the intelligence of a user. Thus, the foregoing description provides significant benefits over conventional identity verification systems that relied upon static data, such as a user's previous address or previous creditors.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, NodelS, Rust, and Python®.

The present disclosure includes technological solutions to analyze data to develop inferred security challenges to provide electronic identity security. The security challenges can include data that is a product of additionally data beyond data stored related to an individual member. In an embodiment, an electronic identity security method includes a processor receiving a request for identity verification from a communication device, accessing data associated with the individual (e.g., member) seeking identity verification stored in a storage device, inferring derived facts about the individual by determining associations between known facts stored in the storage device using an intelligence algorithm or data mining operation, generating at least one identity verification question based on the known facts or the derived facts, evaluating at least one received answer to the at least one identity verification question to determine whether the individual answered the at least one identity verification question correctly, and verifying the individual's identity based on at least one received answer to the at least one identity verification question.

What is claimed is:

1. An electronic identity security method comprising:

receiving, by a processor, a request for identity verification from a device, the request including an identifier of an individual seeking identity verification;

accessing, by the processor, data associated with the individual seeking identity verification stored in a storage device, wherein the data associated with the individual seeking identity verification stored in the storage device comprises known facts about the individual seeking identity verification, wherein a known fact is data stored about the individual seeking identity verification stored in the storage device;

inferring, by the processor, derived facts about the individual by determining associations between multiple known facts about the individual stored in the storage device using a recurrent neural network, the derived facts being different than the known facts and not stored as known facts in the storage device, the derived facts being about the individual, and the derived facts being determined by analyzing the multiple known facts about the individual and determining associations between the multiple known facts about the individual;

inferring, by the processor, geographical data, familial relationships, or time-based factors about the individual based on multiple known facts stored in the storage device using the recurrent neural network;

generating, by the processor, at least one first degree intelligence question based on the known facts;

generating, by the processor, at least one second degree intelligence question based on the known facts and the derived facts;

generating, by the processor, at least one third degree intelligence question based on the known facts, the derived facts, and the geographical data, familial relationships, or time-based factors;

evaluating, by the processor, at least one received answer to at least one identity verification question selected from the at least one first degree intelligence question, the at least one second degree intelligence question, and the at least one third degree intelligence question to determine whether the individual answered the at least one identity verification question correctly; and verifying, by the processor, the individual's identity based on at least one received answer to the at least one identity verification question, wherein the recurrent neural network infers the derived facts about the individual by processing the multiple known facts as inputs in an input layer of the recurrent neural network, and the multiple known facts are provided to neurons of a hidden layer of the recurrent neural network to find potential connections between the known facts, and upon finding the potential connections, the neurons provide the potential connections as outputs to an output layer of the recurrent neural network, and the output layer determines a probability whether the potential connections are the derived facts.

2. The electronic identity security method of claim 1, wherein the data associated with the individual seeking identity verification is medical data, and the at least one identity verification question asks about the individual's medical history.

3. The electronic identity security method of claim 1, wherein inferring, by the processor, further includes inferring derived false answers to the at least one identity verification question based on a data record of a similar individual to the individual's data record; and wherein verifying the individual's identity based on at least one received answer to the at least one identity verification question further comprises:

generating, by the processor, a confidence score based on the at least one received answer to the at least one identity verification question; and determining, by the processor, whether the confidence score exceeds a threshold.

4. The electronic identity security method of claim 3, further comprising:

receiving, by the processor, an indicator of an asset sought by the individual seeking identity verification, the indicator indicating a level of sensitivity, confidentiality, or regulation of the asset.

5. The electronic identity security method of claim 4, further comprising:

setting, by the processor, the confidence score based on the level of sensitivity, confidentiality, or regulation of the asset.

6. The electronic identity security method of claim 4, wherein a number of first degree intelligence questions asked, a number of second degree intelligence questions asked, and a number of third degree intelligence questions asked depends on the level of sensitivity, confidentiality, or regulation of the asset.

7. The electronic identity security method of claim 6, wherein generating the confidence score further comprises:

determining, by the processor, whether the at least one received answer to the at least one first degree intelligence question was correct;

determining, by the processor, whether the at least one received answer to the at least one second degree intelligence question was correct;

determining, by the processor, whether the at least one received answer to the at least one third degree intelligence question was correct; and weighing, by the processor, a correct answer to the at least one second degree intelligence question more heavily than a correct answer to the at least one first degree intelligence question.

8. The electronic identity security method of claim 4, further comprising generating, by the processor, a token when the confidence score exceeds a threshold, the token useful to obtain access to the asset.

9. The electronic identity security method of claim 1, further comprising:

evaluating, by the processor, the at least one first degree intelligence question, the at least one second degree intelligence question, or the at least one third degree intelligence question to determine if the question would be easily guessed by a potential defrauder; and discarding, by the processor, any questions determined to be easily guessed by the potential defrauder.

10. The electronic identity security method of claim 1, wherein the associations between the known facts that generate the derived facts includes similar medical claims or events by the individual.

11. An electronic identity security system for verifying an individual's identity comprising:

a storage device to store known facts about a plurality of individuals; and a processor in communication with the storage device and configured to:

receive a request for identity verification from a device, the request including an identifier of an individual seeking identity verification;

access data associated with the individual seeking identity verification stored in a storage device, wherein the data associated with the individual seeking identity verification stored in the storage device comprises the known facts about the individual seeking identity verification, wherein a known fact is data stored about the individual seeking identity verification stored in the storage device;

infer derived facts about the individual by determining associations between multiple known facts about the individual stored in the storage device using a recurrent neural network, the derived facts being different than the known facts and not stored as known facts in the storage device, the derived facts being about the individual, and the derived facts being determined by analyzing the multiple known facts about the individual and determining associations between the multiple known facts about the individual;

infer geographical data, familial relationships, or time-based factors about the individual based on multiple known facts stored in the storage device using the recurrent neural network;

generate at least one first degree intelligence question based on the known facts;

generate at least one second degree intelligence question based on the known facts and the derived facts;

generate at least one third degree intelligence question based on the known facts, the derived facts, and the geographical data, familial relationships, or time-based factors;

evaluate at least one received answer to at least one identity verification question selected from the at least one first degree intelligence question, the at least one second degree intelligence question, and the at least one third degree intelligence question to determine whether the individual answered the at least one identity verification question correctly; and verify the individual's identity based on at least one received answer to the at least one identity verification question, wherein the recurrent neural network infers the derived facts about the individual by processing the multiple known facts as inputs in an input layer of the recurrent neural network, and the multiple known facts are provided to neurons of a hidden layer of the recurrent neural network to find potential connections between the known facts, and upon finding the potential connections, the neurons provide the potential connections as outputs to an output layer of the recurrent neural network, and the output layer determines a probability whether the potential connections are the derived facts.

12. The electronic identity security system of claim 11, wherein the data associated with the individual seeking identity verification is medical data, and the at least one identity verification question asks about the individual's medical history.

13. The electronic identity security system of claim 11, wherein the processor is further configured to:

generate a confidence score based on the at least one received answer to the at least one identity verification question; and determine whether the confidence score exceeds a threshold.

14. The electronic identity security system of claim 13, wherein the processor is further configured to:

receive an indicator of an asset sought by the individual seeking identity verification, the indicator indicating a level of sensitivity, confidentiality, or regulation of the asset.

15. The electronic identity security system of claim 14, wherein the processor is further configured to:

set the confidence score based on the level of sensitivity, confidentiality, or regulation of the asset.

16. The electronic identity security system of claim 14, wherein a number of first degree intelligence questions asked, a number of second degree intelligence questions asked, and a number of third degree intelligence questions asked depends on the level of sensitivity, confidentiality, or regulation of the asset.

17. The electronic identity security system of claim 16, wherein the processor is further configured to:

determine whether the at least one received answer to the at least one first degree intelligence question was correct;

determine whether the at least one received answer to the at least one second degree intelligence question was correct;

determine whether the at least one received answer to the at least one third degree intelligence question was correct; and weigh a correct answer to the at least one second degree intelligence question more heavily than a correct answer to the at least one first degree intelligence question.

18. The electronic identity security system of claim 14, wherein the processor is further configured to generate a token when the confidence score exceeds a threshold, the token useful to obtain access to the asset.

19. The electronic identity security system of claim 11, wherein the processor is further configured to the at least one first degree intelligence question, the at least one second degree intelligence question, or the at least one third degree intelligence question to determine if the question would be easily guessed by a potential defrauder and discard any questions determined to be easily guessed by the potential defrauder.

20. The electronic identity security system of claim 11, wherein the associations between the known facts that generate the derived facts includes similar medical claims or events by the individual.

21. A non-transitory machine-readable medium comprising instructions, which, when executed by one or more processors, cause the one or more processors to perform the following operations:

receive a request for identity verification from a device, the request including an identifier of an individual seeking identity verification;

access data associated with the individual seeking identity verification stored in a storage device, wherein the data associated with the individual seeking identity verification stored in the storage device comprises known facts about the individual seeking identity verification, wherein a known fact is data stored about the individual seeking identity verification stored in the storage device;

infer derived facts about the individual by determining associations between multiple known facts about the individual stored in the storage device using a recurrent neural network, the derived facts being different than the known facts and not stored as known facts in the storage device, the derived facts being about the individual, and the derived facts being determined by analyzing the multiple known facts about the individual and determining associations between the multiple known facts about the individual;

infer geographical data, familial relationships, or time-based factors about the individual based on multiple known facts stored in the storage device using the recurrent neural network;

generate at least one first degree intelligence question based on the known facts;

generate at least one second degree intelligence question based on the known facts and the derived facts;

generate at least one third degree intelligence question based on the known facts, the derived facts, and the geographical data, familial relationships, or time-based factors;

evaluate at least one received answer to at least one identity verification question selected from the at least one first degree intelligence question, the at least one second degree intelligence question, and the at least one third degree intelligence question to determine whether the individual answered the at least one identity verification question correctly; and verify the individual's identity based on at least one received answer to the at least one identity verification question, wherein the recurrent neural network infers the derived facts about the individual by processing the multiple known facts as inputs in an input layer of the recurrent neural network, and the multiple known facts are provided to neurons of a hidden layer of the recurrent neural network to find potential connections between the known facts, and upon finding the potential connections, the neurons provide the potential connections as outputs to an output layer of the recurrent neural network, and the output layer determines a probability whether the potential connections are the derived facts.

* * * * *